United States Patent
Lee et al.

(10) Patent No.: US 11,243,667 B2
(45) Date of Patent: Feb. 8, 2022

(54) METHOD AND SYSTEM FOR INFORMATION PROVIDING INTERFACE BASED ON NEW USER EXPERIENCE

(71) Applicant: NAVER CORPORATION, Seongnam-si (KR)

(72) Inventors: Jong Hyun Lee, Seongnam-si (KR); Jong Ju Lee, Seongnam-si (KR); Sungmin Kim, Seongnam-si (KR); Kyung Hwa Chung, Seongnam-si (KR); Yu-Kyung Seo, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 0 days.

(21) Appl. No.: 16/742,471

(22) Filed: Jan. 14, 2020

(65) Prior Publication Data

US 2020/0363918 A1    Nov. 19, 2020

(30) Foreign Application Priority Data

May 13, 2019 (KR) .................. 10-2019-0055442

(51) Int. Cl.
*G06F 3/0481* (2013.01)
*G06F 3/0346* (2013.01)
(Continued)

(52) U.S. Cl.
CPC .......... *G06F 3/0483* (2013.01); *G06F 3/0484* (2013.01); *G06F 3/04817* (2013.01); *G06F 3/04883* (2013.01)

(58) Field of Classification Search
CPC .. G06F 3/0483; G06F 3/04817; G06F 3/0484; G06F 3/04883; G06F 3/0482; G06F 3/04815; G06F 2203/04803
See application file for complete search history.

(56) References Cited

U.S. PATENT DOCUMENTS

| | | | |
|---|---|---|---|
| 9,330,180 B2 * | 5/2016 | Kim | .................. H04M 1/72522 |
| 9,552,439 B1 * | 1/2017 | Krecichwost | ......... G06F 3/0482 |

(Continued)

FOREIGN PATENT DOCUMENTS

| | | | |
|---|---|---|---|
| EP | 3447628 A1 * | 2/2019 | ........... G06F 3/0488 |
| JP | 2013134536 A | 7/2013 | |

(Continued)

OTHER PUBLICATIONS

Naver gets lighter without news, spreads wings with green dot:; Naver Connect Conference 2019 (English abstract).

(Continued)

*Primary Examiner* — Jennifer N Welch
*Assistant Examiner* — Kuang F Chen
(74) *Attorney, Agent, or Firm* — Greer Burns & Crain Ltd.

(57) ABSTRACT

Provided is a method and system for an information providing interface based on new user experience. An information providing interface method includes providing a home board including a search box as an initial interface screen for providing information; providing a first content board according to movement from the home board in a first direction or a second content board according to movement in a second direction that is opposite to the first direction in response to an input event on the home board; and visually displaying a shortcut icon for each board and a currently staying board through a partial area of a screen in response to movement from the first content board or the second content board. Each of the first and the second content boards includes a plurality of subpages and each of the subpages includes a different type of content and movement between subpages is allowed.

21 Claims, 10 Drawing Sheets

(51) Int. Cl.
*G06F 3/0338* (2013.01)
*G06F 3/01* (2006.01)
*G06T 7/50* (2017.01)
*G06F 3/0483* (2013.01)
*G06F 3/0484* (2022.01)
*G06F 3/0488* (2022.01)

(56) References Cited

U.S. PATENT DOCUMENTS

| | | | | |
|---|---|---|---|---|
| 2009/0303676 | A1* | 12/2009 | Behar | G06F 16/9577 361/679.27 |
| 2011/0060988 | A1* | 3/2011 | Mysliwy | G06F 3/0482 715/702 |
| 2013/0104079 | A1* | 4/2013 | Yasui | G06F 3/0482 715/834 |
| 2014/0208269 | A1* | 7/2014 | Boyana | H04M 1/66 715/835 |
| 2016/0098416 | A1* | 4/2016 | Li | G06F 16/90324 707/767 |
| 2016/0334952 | A1* | 11/2016 | Jia | G06F 3/04817 |
| 2017/0329490 | A1* | 11/2017 | Viktorovna | G06F 17/30905 |
| 2020/0142554 | A1* | 5/2020 | Lin | G06F 3/04883 |

FOREIGN PATENT DOCUMENTS

| | | |
|---|---|---|
| KR | 1020120031357 A | 4/2012 |
| KR | 101699059 B1 | 1/2017 |
| KR | 1020180045616 A | 5/2018 |
| KR | 1020180109442 A | 10/2018 |
| WO | 2012157563 A1 | 11/2012 |

OTHER PUBLICATIONS

Korean Office Action issued in corresponding to Korean patent application No. 10-2019-0055442, dated Oct. 26, 2020.

Youtube; "How To Disable Flipboard On ANY Samsung Device!"; Oct. 23, 2020 https://www.youtube.com/watch?v=s4IR5NVa1wc.

Must-see video if you want to join Naver (2) Naver Connect 2019; "The changed mobile main explained by the Naver design manager. Why and how did you change it?"; Seung-Eon Kim Head of Design Design, YouTube, [online], Oct. 16, 2018, 11:28-17:40, https://www.youtube.com/watch?v=RGIwgLr_Bew.

Japanese Office Action dated Dec. 1, 2020 by the Japanese Patent Office corresponding to Japanese patent application No. 2019-185376.

* cited by examiner

METHOD AND SYSTEM FOR INFORMATION PROVIDING INTERFACE BASED ON NEW USER EXPERIENCE

CROSS-REFERENCE TO RELATED APPLICATION(S)

This U.S. non-provisional application claims the benefit of priority under 35 U.S.C. § 119 to Korean Patent Application No. 10-2019-0055442 filed on May 13, 2019, in the Korean Intellectual Property Office (KIPO), the entire contents of which are incorporated herein by reference.

BACKGROUND OF THE INVENTION

Field of Invention

One or more example embodiments of the present invention relate to technology for configuring an information providing interface based on new user experience (UX).

Description of Related Art

With rapid development of information technology, various types of terminals such as a mobile communication terminal and a personal computer are configured to be capable of performing a variety of functions.

For example, a mobile communication terminal is configured to be capable of performing a basic voice call function and various other functions, such as data communication, taking a photo or a video using a camera, playing music or a video file, a game, and viewing a broadcast.

Also, with the realization of such various functions, functions provided at a portal site are diversified. Accordingly, an amount of time in which a user stays at a portal site is continuously increasing.

In general, a portal site refers to an Internet site that complexly provides a variety of contents. Currently, a portal site provides various contents, for example, news information, shopping information, weather information, media information, a blog service, and a reinforced search function, starting with providing contents such as various types of document information according to a mail function and a search function.

As the portal sites provide the wide range of contents, further efficient interface technology is required.

For example, an apparatus and method for providing a portal page that may quickly verify desired information without leaving a portal page is disclosed in Korean Laid-Open Publication No. 10-2018-0045616, published on May 4, 2018.

BRIEF SUMMARY OF THE INVENTION

One or more example embodiments provide a method and system for an information providing interface based on new user experience (UE).

One or more example embodiments also provide a method and system for an information providing interface that is three-dimensionally connectable between screens.

One or more example embodiments also provide a method and system for an information providing interface of various interactions.

According to an aspect of at least one example embodiment, there is provided an information providing interface method implemented by a computer system. The computer system includes at least one processor configured to execute computer-readable instructions included in a memory, and the information providing interface method includes providing, by the at least one processor, a home board including a search box as an initial interface screen for providing information; providing, by the at least one processor, a first content board according to a movement from the home board in a first direction or a second content board according to a movement in a second direction that is opposite to the first direction in response to an input event on the home board; and visually displaying, by the at least one processor, a shortcut icon for each board and a currently staying board through a partial area of a screen in response to a movement from the first content board or the second content board, and each of the first content board and the second content board includes a plurality of subpages and each of the subpages includes a different type of content and a movement between the subpages is allowed.

The providing of the first content board or the second content board may include moving from the home board to the first content board in response to a swipe input from right to left and moving the subpages in left-to-right order starting from a leftmost subpage of the first content board; and moving from the home board to the second content board in response to a swipe input from left to right and moving the subpages in right-to-left order starting from a rightmost subpage of the second content board.

The providing of the first content board or the second content board may include moving to a last-order subpage of another content board and moving the subpages in reverse order in response to a swipe input in the same direction as a previous one on a last-order subpage of one of the first content board and the second content board.

The shortcut icon for each board may be configured to support an immediate redirection to a corresponding board without going through another board or another subpage.

The subpages included in the first content board and the second content board may be determined based on a user setting.

Order in which the subpages included in the first content board and the second content board are displayed may be determined based on a user setting.

The displaying may include providing a home icon immediately redirectable to the home board, a first icon directly redirectable to the first content board, and a second icon immediately redirectable to the second content board on a lower end area of the screen, and simultaneously highlighting and displaying an icon of a current staying board to be distinguished from other icons when a subpage included in the first content board or the second content board is displayed.

The displaying may include moving to a subpage set to first order among subpages of a corresponding content board in response to moving to the first content board using the first icon or moving to the second content board using the second icon.

The displaying may include displaying a subpage list of a current staying board on an upper end area of the screen in response to displaying a subpage included in the first content board or the second content board, and displaying a bar that is automatically positioned to a position corresponding to a current subpage in response to a movement between subpages.

The home board may include a home button that is an interaction button on a lower end area, and the providing of the home board may include providing at least one of a multi-search area including a voice search and an image search and a shortcut area for providing a service page or an immediate redirection to the service page on the home board in response to an input of the home button on the home board.

According to an aspect of at least one example embodiment, there is provided a non-transitory computer-readable storage medium storing instructions that, when executed by a processor, cause the processor to perform the information providing interface method described above.

According to an aspect of at least one example embodiment, there is provided a computer system including at least one processor configured to execute computer-readable instructions stored in a memory. The at least one processor is configured to provide a home board including a search box as an initial interface screen for providing information, provide a first content board according to a movement from the home board in a first direction or a second content board according to a movement in a second direction that is opposite to the first direction in response to an input event on the home board, and visually display a shortcut icon for each board and a currently staying board through a partial area of the screen in response to a movement from the first content board or the second content board, and each of the first content board and the second content board includes a plurality of subpages and each of the subpages includes a different type of content and a movement between the subpages is allowed.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
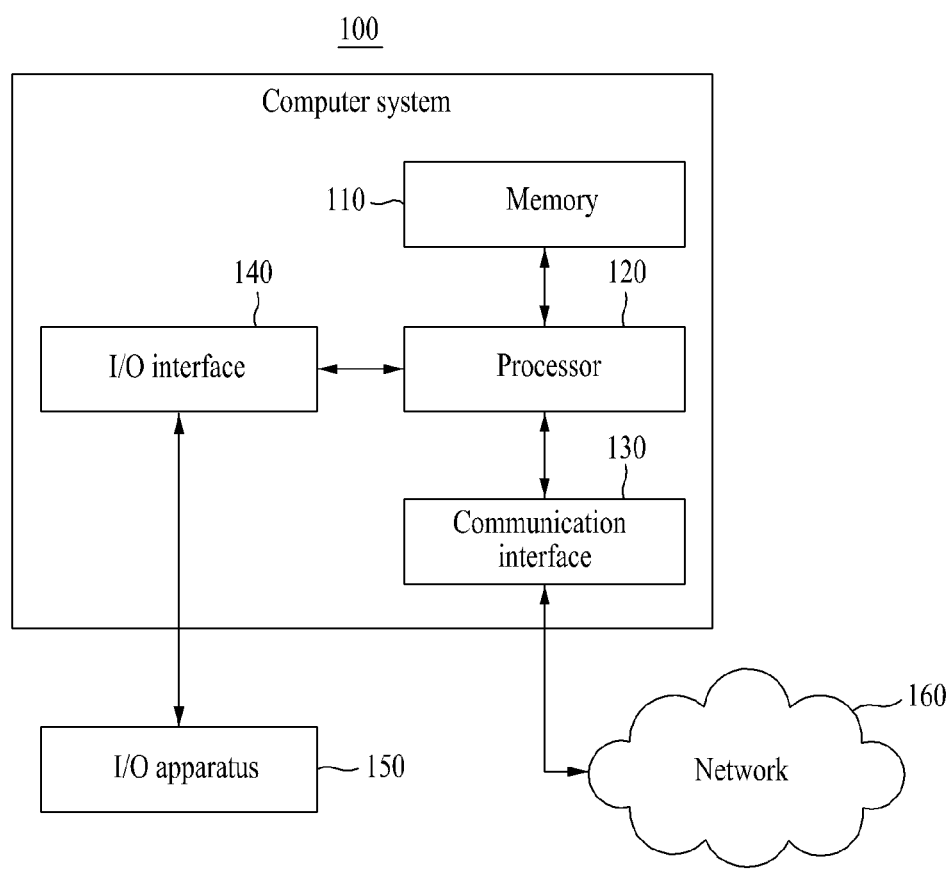
FIG. 1 is a diagram illustrating an example of a computer system according to one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to an information providing interface based on new user experience (UE).

The example embodiments including the detailed disclosure herein may provide an information providing interface capable of performing three-dimensional (3D) connection and various interactions between screens and may achieve many advantages in terms of variety, connectivity, accessibility, efficiency, convenience, and cost saving.

FIG. 1 is a block diagram illustrating an example of a computer system according to one example embodiment. For example, a data storage system according to example embodiments may be implemented using a computer system 100 of FIG. 1. Referring to FIG. 1, the computer system 100 may include a memory 110, a processor 120, a computer interface 130, and an input/output (I/O) interface 140.

The memory 110 may include a permanent mass storage device, such as random access (RAM), read only memory (ROM), and a disc drive, as non-transitory computer-readable storage medium. Here, the permanent mass storage device, such as ROM and disc drive, may be included in the computer system 100 as a separate permanent storage device different from the memory 110. Also, an operating system (OS) and at least one program code may be stored in the memory 110. Such software components may be loaded from another non-transitory computer-readable storage medium to the memory 110. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 110 through the communication interface 130, instead of, or in addition to, the non-transitory computer-readable storage medium. For example, the software components may be loaded to the memory 110 of the computer system 100 based on a computer program installed by files received over a network 160.

The processor 120 may be configured to process computer-readable instructions of a computer program by performing basic arithmetic operations, logic operations, and I/O operations. The computer-readable instructions may be provided from the memory 110 or the communication interface 130 to the processor 120. For example, the processor 120 may be configured to execute received instructions in response to a program code stored in a storage device, such as the memory 120.

The communication interface 130 may provide a function for communication between the computer system 100 and another apparatus, for example, the aforementioned storage devices over the network 160. For example, the processor 120 of the computer system 100 may transfer a request or an instruction created based on the program code stored in the storage device, such as the memory 110, to other apparatuses over the network 160 under control of the communication interface 130. Inversely, a signal, an instruction, data, a file, etc., from another apparatus may be received at the computer system 100 through the communication interface 130 of the computer system 100. For example, a signal, an instruction, data, etc., received through the communication interface 130 may be transferred to the processor 120 or the memory 110, and a file, etc., may be stored in a storage medium, for example, the permanent storage device, further includable in the computer system 100.

The I/O interface 140 may be a device used for interface with an I/O apparatus 150. For example, an input device may include a device, such as a microphone, a keyboard, and a mouse, and an output device may include a device, such as a display device or panel and a speaker. As another example, the I/O interface 140 may be a device for interface with the I/O apparatus 150 in which an input function and an output function are integrated into a single function, such as a touchscreen. The I/O apparatus 150 may be configured as a single apparatus with the computer system 100.

According to other example embodiments, the computer system 100 may include a number of components greater or less than a number of components shown in FIG. 1. However, there is no need to clearly illustrate many components according to the related art. For example, the computer system 100 may include at least a portion of the I/O apparatus 150, or may further include other components, for example, a transceiver, a database (DB), and the like.

Methods according to example embodiments may be configured in a form of an instruction executable through various computer systems and may be recorded in non-transitory computer-readable recording media.

A program according to the example embodiment may be configured in a PC-based program or an application exclusive for a mobile terminal. Herein, an app for providing information may be configured in a form of an independently operating program or an in-app form of a specific application to be operable on the specific application.

Also, methods according to example embodiments may be performed in such a manner that an application associated with a server system providing a portal service platform including a search service controls a user terminal. For example, the application may include a module to control the user terminal to provide an interface for a portal service. Also, the application may be installed on the user terminal through a file provided from a file distribution system. For example, the file distribution system may include a file transmitter (not shown) configured to transmit the file in response to a request from the user terminal.

Hereinafter, example embodiments of a method and system for an information providing interface based on new user experience (UE) are described.

Figure 2:
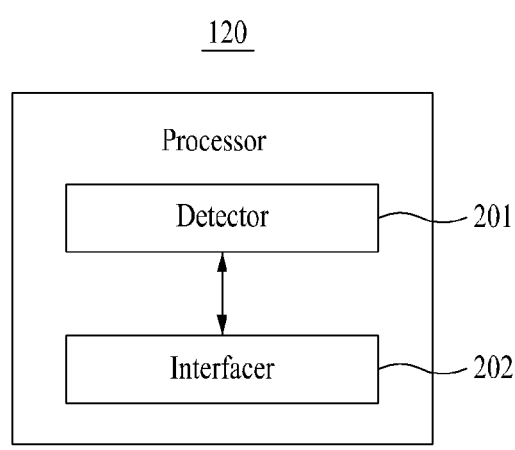
FIG. 2 is a diagram illustrating an example of components includable in a processor of a computer system according to one example embodiment.
Figure 3:
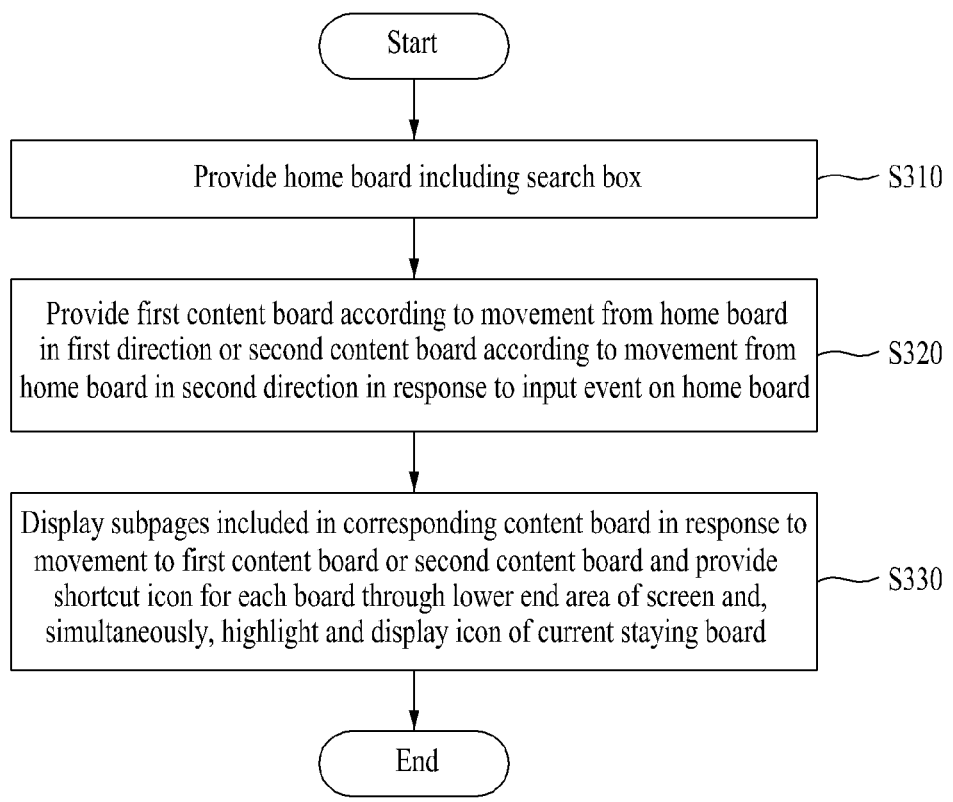
FIG. 3 is a flowchart illustrating an example of an information providing interface method performed by a computer system according to one example embodiment.

FIG. 2 is a diagram illustrating an example of components includable in the processor 120 of the computer system 100 according to one example embodiment, and FIG. 3 is a flowchart illustrating an example of an information providing interface method performed by the computer system 100 according to one example embodiment.

Referring to FIG. 2, the processor 120 may include a detector 201 and an interfacer 202. Components of the processor 120 may be representations of different functions performed by the processor 120 in response to a control instruction provided according to at least one program code. For example, the detector 201 may be used as a functional representation that operates to control the computer system 100 such that the processor 120 may detect an input event by the user.

The processor 120 and components of the processor 120 may perform operations S310 to S330 included in the information providing interface method of FIG. 3. For example, the processor 120 and the components of the processor 120 may be configured to execute an instruction according to a code of an OS included in the memory 110 and at least one program code. Here, the at least one program code may correspond to a code of a program configured to process the information providing interface method.

The information providing interface method may not be performed in illustrated order and a portion of operations may be omitted or an additional process may be further included.

The processor 120 may read a necessary instruction from the memory 110 to which instructions associated with control of the computer system 100 are loaded. In this case, the read instruction may include an instruction for controlling the processor 120 to perform the following operations S310 to S330. Here, the processor 120 and the detector 201 and interfacer 202 included in the processor 120 may be respectively different functional representations of the processor 120 to perform the following operations S310 to S330 by executing an instruction of a portion corresponding to the program code loaded to the memory 110. For execution of operations S310 to S330, the processor 120 and the components of the processor 120 may directly process an operation or may control the computer system 100 in response to the control instruction.

The detector 201 serves to detect an input event by the user in response to a touch or a motion of the user on the I/O apparatus 150 the computer system 100. For example, when the computer system 100 includes a touchscreen as the I/O apparatus 150, the detector 201 may detect a touch point by the user or a continuous touch gesture as the input event. As another example, when the computer system 100 includes at least one motion detectable device such as a camera, a motion sensor, an infrared (IR) sensor, and an image sensor, the detector 201 may detect a specific operation by the motion of the user as the input event.

The interfacer 202 serves to execute a user interface for providing information and may control an information providing interface in response to the input event by the user.

In detail, referring to FIG. 3, in operation S310, the interfacer 202 may provide a home screen (hereinafter, referred to as a home board) including a search box as an initial interface screen of the I/O apparatus 150 for providing information (see FIG. 5).

In operation S320, the interfacer 202 may provide a content screen (hereinafter, referred to as a first content board) according to a movement from the home board in a first direction or a content screen (hereinafter, referred to as a second content board) according to a movement from the home board in a second direction that is opposite to the first direction in response to an input event on the home board. For example, a swipe gesture may be applied as a screen switching gesture. For example, if the user swipes the home board from right to left, the interfacer 202 may provide the first content board. On the contrary, if the user swipes the home board from left to right, the interfacer 202 may provide the second content board.

As used in the present specification, a subpage is an interface screen for providing content, and refers to a service page that provides content such as news, entertainment, sports, and local information by classifying them into types or characteristics. A bundle (or group) of these subpages constitutes a content board, and the bundle of subpages arranged one side with regards to the home board is referred to as the first content board, and the bundle of subpages arranged on the other side with regards to the home board is referred to as the second content board.

Figure 4:
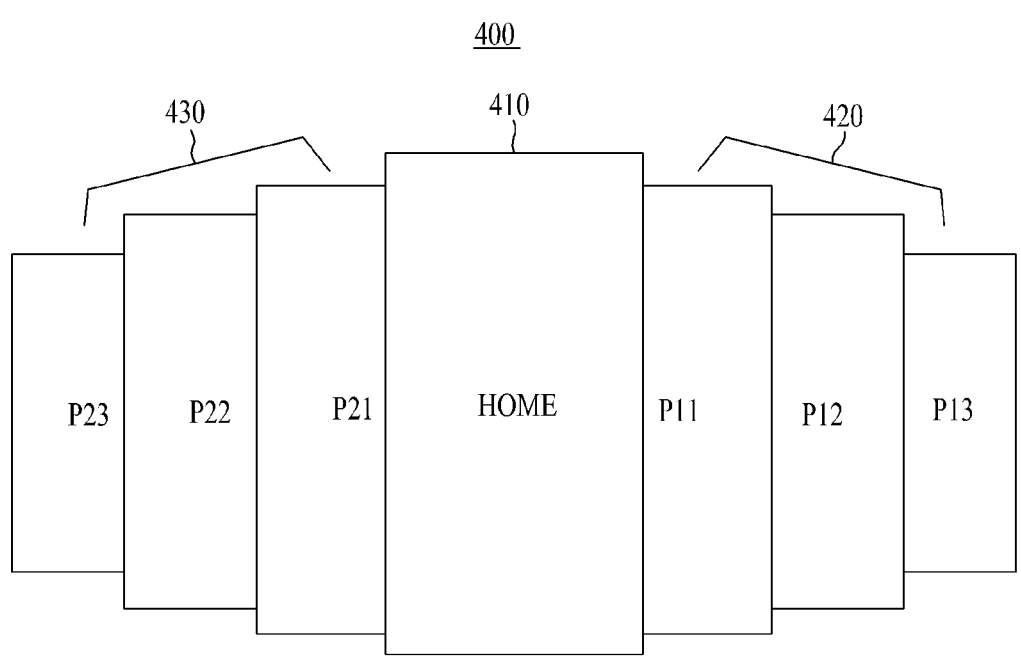
FIG. 4 illustrates an example of an information providing interface according to one example embodiment.

In operation S330, the interfacer 202 may display a single subpage among subpages included in a corresponding content board in response to a movement from the home board to the first content board or the second content board (see FIG. 4). Here, the interfacer 202 may provide a shortcut icon for each board through a partial area of a screen, for example, a lower end area, and may simultaneously highlight and display a shortcut icon of a currently staying board. That is, in response to displaying a subpage included in the first content board or the second content board, the interfacer 202 may provide a shortcut icon (hereinafter, referred to as a home button) immediately redirectable to the home board, a shortcut icon (hereinafter, referred to as a first icon) immediately redirectable to the first content board, and a shortcut icon (hereinafter, referred to as a second icon) immediately redirectable to the second content board on a lower end area of a corresponding screen. Here, when a subpage included in the first content board is displayed, the interfacer 202 may highlight and thereby display the first icon to be distinguished from other icons and may visually display that the user is currently staying on the first content board through the lower end area of the screen. That is, it is possible to immediately redirect from the first content board to the home board using the home button or to redirect from the first content board to the second content board using the second icon. Likewise, when a subpage included in the second content board is displayed, the interfacer 202 may highlight and thereby display the second icon to be distinguished from other icons and may visually display that the user is currently staying on the second content board through the lower end area of the screen. It is possible to immediately redirect from the second content board to the home board using the home button or to redirect from the second content board to the first content board using the first icon.

FIG. 4 illustrates an example of an information providing interface according to one example embodiment.

Referring to FIG. 4, an information providing interface 400 displayed on the I/O apparatus 150, preferably a touchscreen, may include a home board 410, a first content board 420 displayed in response to a right-to-left swipe from the home board 410, and a second content board 430 displayed in response to a left-to-right swipe from the home board 410.

For example, the home board 410 may include a single page, and each of the first content board 420 and the second content board 430 may include a plurality of subpages.

Each of the subpages included in the first content board 420 and the second content board 430 includes a different type of content, and is redirectable in a direction corresponding to a swipe gesture between subpages.

For convenience of description, the first content board 420 includes three subpages P11, P12, and P13, and the second content board 430 includes three subpages P21, P22, and P23.

Subpages included in the first content board 420 and the second content board 430 may be determined in advance and may also be selectively determined based on a user setting.

Further, order in which each of the subpages is displayed may be determined in advance and may be determined based on a user setting.

Figure 5:
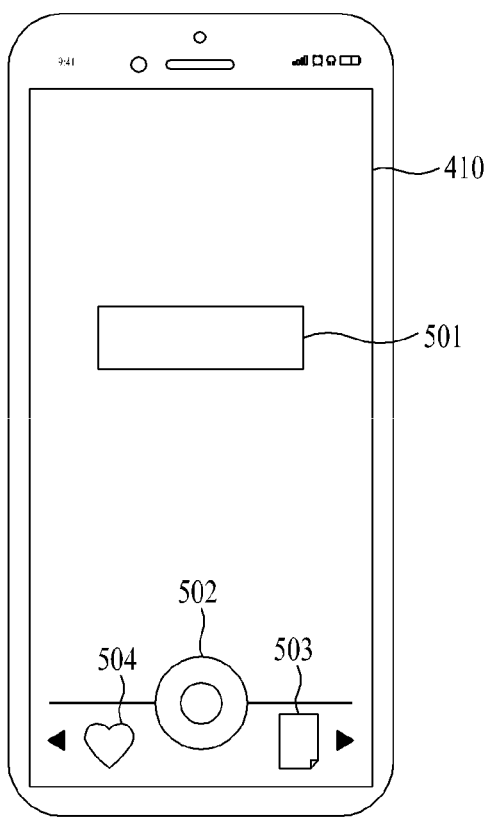
FIGS. 5 and 6 illustrate examples of a home board according to one example embodiment.
Figure 6:
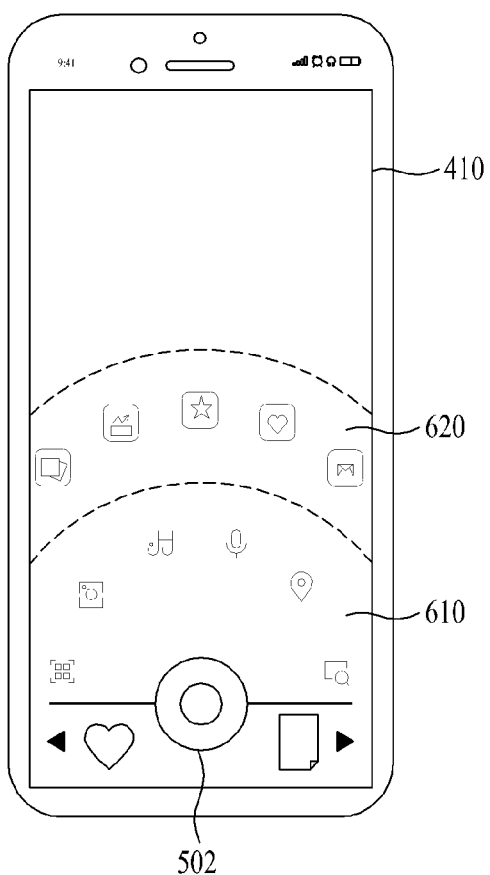

FIGS. 5 and 6 illustrate examples of a home board according to one example embodiment.

Referring to FIG. 5, the interfacer 202 may provide the home board 410 as an initial interface screen for providing information.

The home board 410 may include a search box 501 for receiving a keyword, a uniform resource locator (URL), etc., as a query. Here, the search box 501 may include an input-based search icon.

A home button 502 may be further included in a lower end area of the home board 410 as a touch-based interaction button.

Referring to FIG. 6, in response to a selection on the home button 502 on the home board 410, at least one of a multi-search area 610 and a shortcut area 620 may be displayed on the home board 410. The multi-search area 610 may include a number of icons, each for conducting a particular type of search, such as an image search, a music search, a voice search, a map search, or for making payments using a quick response (QR) code, etc. The shortcut area 620 displays a number of icons, each corresponding to a predefined subpage. A selection of an icon in the shortcut area 620 results in immediate redirection to the subpage corresponding to the selected icon.

Also, functions included in the multi-search area 610 and the shortcut area 620 may be determined in advance or may be determined based on a user setting.

Icons of the respective functions included in the multi-search area 610 and the shortcut area 620 may be aligned in a circular form based on the home button 502. At least one of the multi-search area 610 and the shortcut area 620 may be touch-based rotation-scrollable along a corresponding circular form.

If the home button 502 is reselected on the home board 410 in a state in which the multi-search area 610 and the shortcut area 620 are unfolded, the multi-search area 610 and the shortcut area 620 are processed to be hidden and the search box 501 is reactivated as shown in FIG. 5.

Referring again to FIG. 5, a first icon 503 immediately redirectable to the first content board 420 and a second icon 504 immediately redirectable to the second content board 430 may be further included in the lower end area of the home board 410.

In response to an input of the first icon 503 or a right-to-left swipe on the home board 410, the interfacer 202 may provide the first content board 420.

Figure 7:
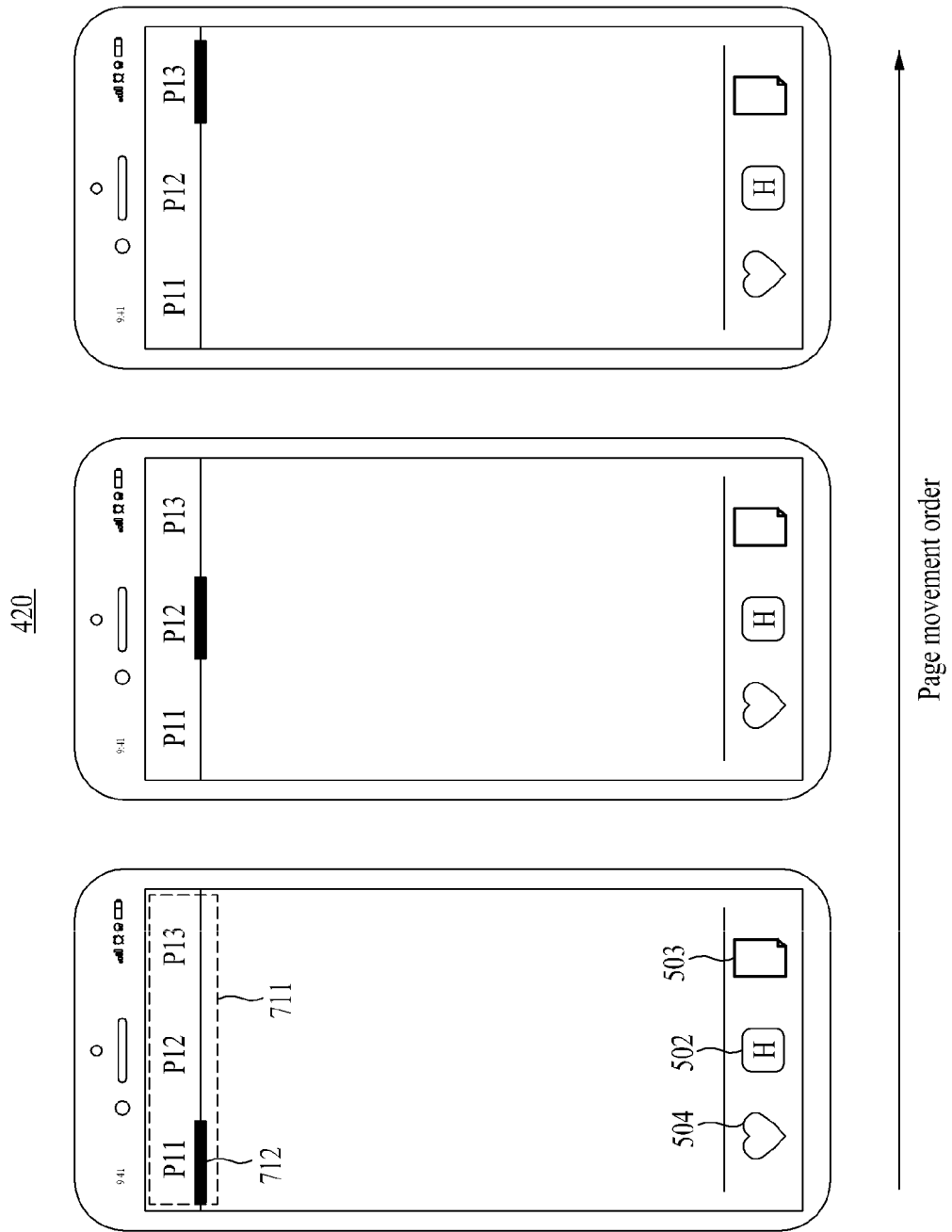
FIGS. 7 and 9 illustrate examples of a first content board displayed in response to a movement from a home board in a first direction according to one example embodiment.

Referring to FIG. 7, in response to a movement from the home board 410 to the first content board 420, a subpage P11 set to first order among the subpages included in the first content board 420 may be displayed The first content board 420 may display a subpage list 711 included in the first content board 420 on an upper end area of a screen and may display a bar 712 indicating the currently staying or displayed subpage.

The first content board 420 may move the subpages in order of the first subpage P11, a second subpage P12, and a third subpage P13 in responses to an input of the right-to-left swipe. That is, the first content board 420 moves the subpages in left-to-right order starting from a leftmost subpage of the first content board 420.

In response to an input of the second icon 504 or a left-to-right swipe on the home board 410, the interfacer 202 may provide the second content board 430.

Figure 8:
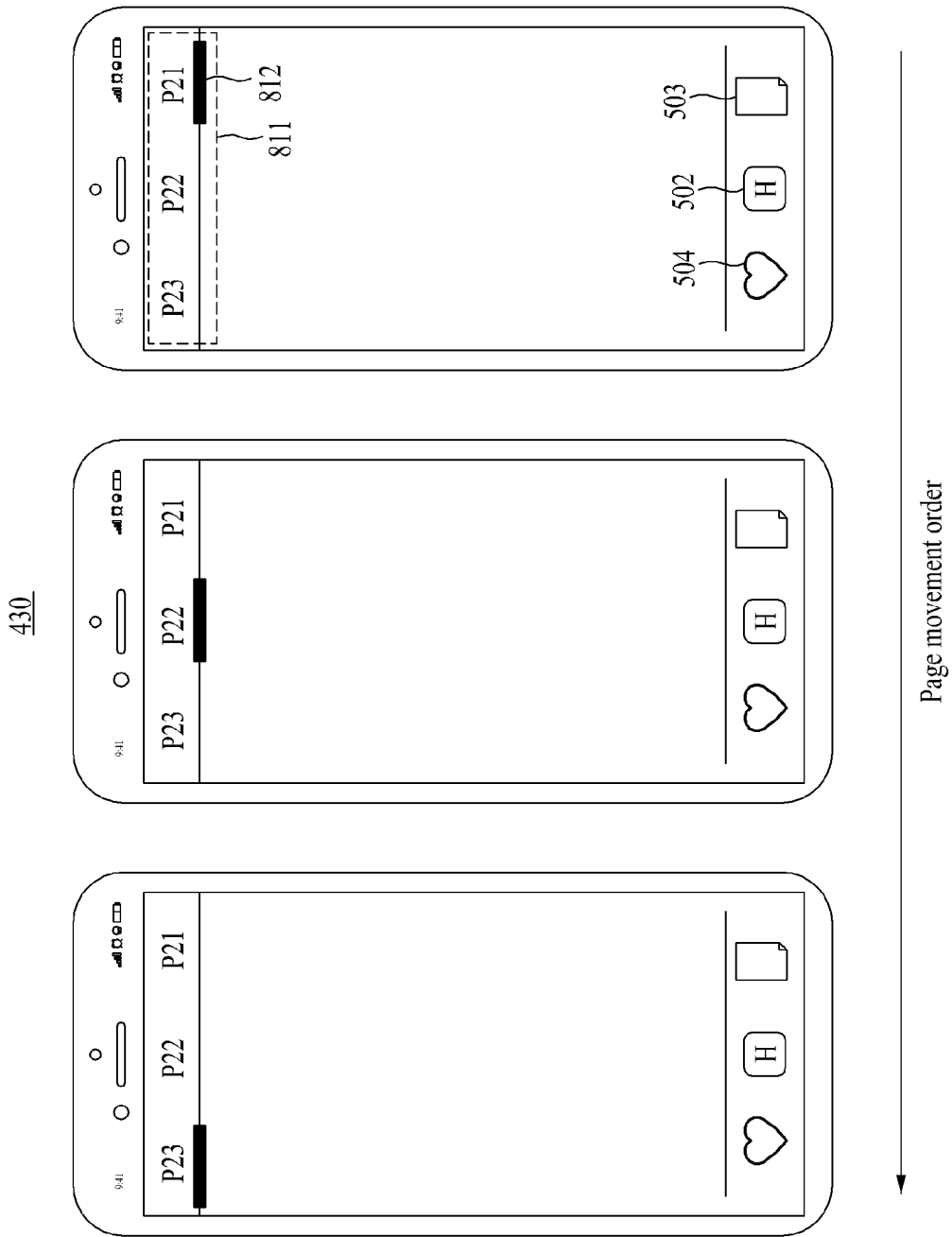
FIGS. 8 and 10 illustrate examples of a second content board displayed in response to a movement from a home board in a second direction according to one example embodiment.

Referring to FIG. 8, in response to a movement from the home board 410 to the second content board 430, a subpage P21 set to first order among the subpages included in the second content board 430 may be displayed.

The second content board 430 may display a subpage list 811 included in the second content board 430 on an upper end area of a screen and may display a bar 812 indicating the currently staying or displayed subpage.

The second content board 430 may move the subpages in order of the first subpage P21, a second subpage P22, and a third subpage P23 in response to an input of the left-to-right swipe. That is, the second content board 430 moves the subpages in left-to-right order starting from a rightmost subpage of the second content board 430.

If a swipe is input in the same direction as a previous direction on the subpage set to last order, i.e., the last subpage, on a screen of one of the first content board 420 and the second content board 430, the interfacer 202 moves to the subpage set to last order, i.e., the last subpage, on another screen of the first content board 420 and the second content board 430.

That is, the interfacer 202 may support a movement, that is, a redirection between screens at a cycle including the home board 410, the first content board 420, and the second content board 430.

Figure 9:
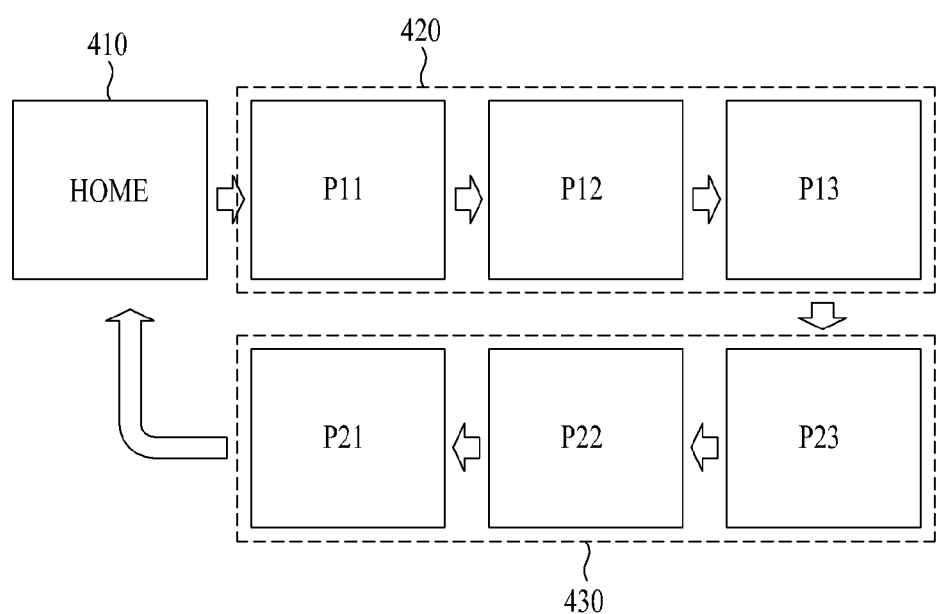

Referring to FIG. 9, a movement between screens is performed at a cycle in which, if a movement from the home board 410 to the first content board 420 is performed and the last subpage P13 of the first content board 420 is reached in response to an input of a right-to-left swipe, and, in this state, a swipe corresponding to the same right-to-left direction is repeatedly input, a movement to the second content board 430 is performed and subpages are moved in reverse order, starting from the subpage P23 set to last order, i.e., the last subpage P23, of the second content board 430.

Figure 10:
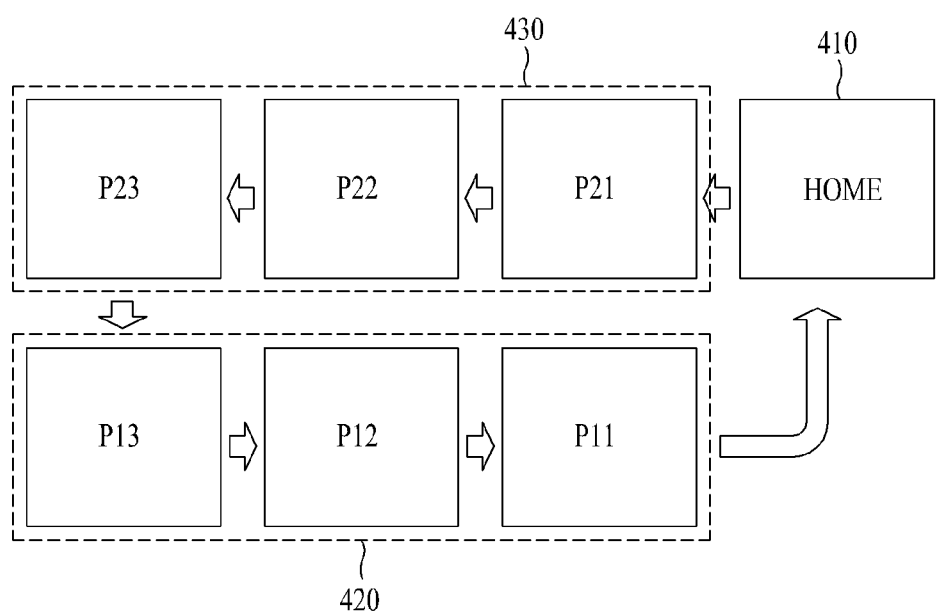

In contrast, referring to FIG. 10, a movement between screens is performed at a cycle in which, if a movement from the home board 410 to the second content board 430 is performed and the last subpage P23 of the second content board 430 is reached in response to an input of a left-to-right swipe, and, in this state, a swipe corresponding to the same left-to-right direction is repeatedly input, a movement to the first content board 420 is performed and subpages are moved in reverse order, starting from the subpage P13 set to the last order of the first content board 420.

Referring again to FIGS. 7 and 8, the home button 502 immediately redirectable to the home board 410, the first icon 503 immediately redirectable to the first content board 420, and the second icon 504 immediately redirectable to the second content board 430 may be displayed on the lower end area of each of the first content board 420 and the second content board 430. Here, immediate redirection indicates immediately redirecting, that is, moving to a correspond board using an icon without going through another board or subpage.

Referring to FIG. 7, when a currently staying screen is a subpage of the first content board 420, the first icon 503 may be displayed to be highlighted compared to other icons, for example, the home button 502 and the second icon 504. Likewise, referring to FIG. 8, when a currently staying screen is a subpage of the second content board 430, the second icon 504 may be displayed to be highlighted compared to other icons, for example, the home button 502 and the first icon 503.

In response to an input of the second icon 504 in a state in which a subpage of the first content board 420 is displayed, it is possible to immediately redirect to the second content board 430. In response to an input of the first icon 503 in a state in which a subpage of the second content board 430 is displayed, it is possible to immediately redirect to the first content board 420.

In the case of immediately moving from the second content board 430 to the first content board 420 using the first icon 503 or in the case of immediately moving from the first content board 420 to the second content board 430 using the second icon 504, a movement to a subpage set to first order, i.e., the first subpage, among subpages of a corresponding content board is performed.

Likewise, in response to an input of the first icon 503 in a state in which a second or higher-order subpage of the first content board 420 is displayed, it is possible to immediately redirect to the first subpage of the first content board 420. In response to an input of the second icon 504 in a state in which a second or higher-order subpage of the second content board 430 is displayed, it is possible to immediately redirect to the first subpage of the second content board 430.

On each of the first content board 420 and the second content board 430, the bar 712, 812 displayed on a corresponding upper end area of a screen is automatically positioned to be a position corresponding to a currently staying subpage.

Although it is generally known to provide a movement between pages through a bidirectional swipe with respect to a plurality of pages configured as a single content board, the information providing interface according to example embodiments may provide the first content board 420 in response to a swipe input in one direction and may provide the second content board 430 different from the first content board 420 in response to a swipe input in another direction based on the home board 410. Here, an interface based on new and various UE may be configured by maintaining text-based content or interface familiar to the user on one content board and by applying a new type of content or interface on another content board.

As described above, according to example embodiments, it is possible to provide an information providing interface based on new UE and to provide an information providing interface capable of performing further 3D connection and various interactions between screens.

The apparatuses described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable recording media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable recording media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An information providing interface method implemented by a computer system having at least one processor configured to execute computer-readable instructions included in a memory, wherein the information providing interface method comprises:

providing, by the at least one processor, a single-page home board including at least one search icon on an interface screen for conducting a search through a portal service;

providing, by the at least one processor, a first content board on the interface screen according to a movement from the home board in a first direction or a second content board on the interface screen according to a movement in a second direction that is opposite to the first direction in response to an input event on the home board; and visually displaying, by the at least one processor, a home shortcut icon corresponding to the home board, a single first shortcut icon corresponding to the first content board and a single second shortcut icon corresponding to the second content board on a partial area of the interface screen for immediately redirecting the home board, the first content board or the second content board onto the interface screen in response to a selection of a corresponding one of the home, first or second shortcut icon, wherein the home board is provided on an entirety of the interface screen separately from the first content board or the second content board, and each of the first content board and the second content board includes a plurality of subpages, each of the subpages including a different type of content and movable between the subpages on the interface screen, wherein the selection of the shortcut icon corresponding to the first content board or the second content board from the home board directly displays one of the plurality of subpages of the corresponding first content board or the second content board on the interface screen, and other of the plurality of subpages of the corresponding first content board or the second content boards is displayed on the interface screen by a swipe input on the interface screen displaying the one of the plurality of subpages, wherein the providing of the home board comprises providing at least one of a multi-search area including a voice search and an image search and a shortcut area for providing a service page or an immediate redirection to the service page on the home board in response to an input of the home shortcut icon on the home board, and wherein the multi-search area and the shortcut area are aligned in a circular form based on the home shortcut icon and at least one of the multi-search area and the shortcut area is touch-based rotation-scrollable along the circular form.

2. The method of claim 1, wherein the providing of the first content board or the second content board comprises:
moving from the home board to the first content board in response to a swipe input from right to left and moving the subpages in left-to-right order starting from a leftmost subpage of the first content board; and
moving from the home board to the second content board in response to a swipe input from left to right and moving the subpages in right-to-left order starting from a rightmost subpage of the second content board.

3. The method of claim 2, wherein the providing of the first content board or the second content board comprises moving to a last-order subpage of another content board and moving the subpages in reverse order in response to a swipe input in the same direction as a previous swipe input on a last-order subpage of one of the first content board and the second content board.

4. The method of claim 1, wherein the subpages included in the first content board and the second content board are determined based on a user setting.

5. The method of claim 1, wherein an order in which the subpages included in the first content board and the second content board are displayed is determined based on a user setting.

6. The method of claim 1, wherein the displaying of the shortcut icons comprises:
simultaneously highlighting and displaying one of the first and second shortcut icons corresponding to the first content board or the second content board of a currently staying board to be distinguished from other of the first and second shortcut icons corresponding to the first content board or the second content board when a subpage included in the first content board or the second content board is displayed.

7. The method of claim 6, wherein the displaying of one of the first and second shortcut icons comprises moving to a subpage set to first order among subpages of a corresponding first content board or second content board in response to moving to the first content board using the corresponding first shortcut icon or moving to the second content board using the corresponding second shortcut icon.

8. The method of claim 1, wherein the displaying of the first and second shortcut icons comprises displaying a subpage list of a currently staying board on an upper end area of the interface screen in response to displaying a subpage included in the first content board or the second content board, and displaying a bar that is automatically positioned to a position corresponding to a current subpage in response to a movement between subpages.

9. The method of claim 1, wherein the home shortcut icon is located on a lower end area of the interface screen.

10. The method of claim 1, wherein the search icon is a search box for receiving an input information for the search through the portal service.

11. The method of claim 1, wherein one of the first content board or the second content board is provided on the interface screen from another of the first content board or the second content board by a swipe input in one direction on at least one of the subpages of the another of the first content board or the second content board displayed on the interface screen.

12. A non-transitory computer-readable storage medium storing instructions that, when executed by a processor, cause the processor to perform the information providing interface method of claim 1.

13. A computer system comprising:
at least one processor configured to execute computer-readable instructions stored in a memory,
wherein the at least one processor is configured to
provide a single-page home board including at least one search icon on an interface screen for conducting a search through a portal service,
provide a first content board on the interface screen according to a movement from the home board in a first direction or a second content board on the interface screen according to a movement in a second direction that is opposite to the first direction in response to an input event on the home board, and
visually display a home shortcut icon corresponding to the home board, a single first shortcut icon corresponding to the first content board and a single second shortcut icon corresponding to the second content board on a partial area of the interface screen for immediately redirecting the home board, the first content board or the second content board onto the interface screen in response to a selection of a corresponding one of the home, first or second shortcut icon,
wherein the home board is provided on an entirety of the interface screen separately from the first content board or the second content board, and each of the first content board and the second content board includes a plurality of subpages, each of the subpages including a different type of content and movable between the subpages pm the interface screen,
wherein the selection of the shortcut icon corresponding to the first content board or the second content board from the home board directly displays one of the plurality of subpages of the corresponding first content board or the second content board on the interface screen, and other of the plurality of subpages of the corresponding first content board or the second content boards is displayed on the interface screen by a swipe input on the interface screen displaying the one of the plurality of subpages, wherein the providing of the home board comprises providing at least one of a multi-search area including a voice search and an image search and a shortcut area for providing a service page or an immediate redirection to the service page on the home board in response to an input of the home shortcut icon on the home board, and wherein the multi-search area and the shortcut area are aligned in a circular form based on the home shortcut icon and at least one of the multi-search area and the shortcut area is touch-based rotation-scrollable along the circular form.

14. The computer system of claim 13, wherein the at least one processor is configured to move from the home board to the first content board in response to a swipe input from right to left and move the subpages in left-to-right order starting from a leftmost subpage of the first content board, and move from the home board to the second content board in response to a swipe input from left to right and move the subpages in right-to-left order starting from a rightmost subpage of the second content board.

15. The computer system of claim 14, wherein the at least one processor is configured to move to a last-order subpage of another content board and move the subpages in reverse order in response to a swipe input in the same direction as a previous swipe input on a last-order subpage of one of the first content board and the second content board.

16. The computer system of claim 13, wherein the subpages included in the first content board and the second content board are determined based on a user setting.

17. The computer system of claim 13, wherein the at least one processor is configured to simultaneously highlight and display one of the first and second shortcut icons corresponding to the first content board or the second content board of a currently staying board to be distinguished from other of the first and second shortcut icons corresponding to the first content board or the second content board when a subpage included in the first content board or the second content board is displayed.

18. The computer system of claim 17, wherein the at least one processor is configured to move to a subpage set to first order among subpages of a corresponding first content board or second content board in response to moving to the first content board using the corresponding first shortcut icon or moving to the second content board using the corresponding second shortcut icon.

19. The computer system of claim 13, wherein the at least one processor is configured to display a subpage list of a currently staying board on an upper end area of the interface screen in response to displaying a subpage included in the first content board or the second content board, and display a bar that is automatically positioned to a position corresponding to a current subpage in response to a movement between subpages.

20. The computer system of claim 13, wherein the home shortcut icon is located on a lower end area of the interface screen.

21. The method of claim 13, wherein the search icon is a search box for receiving an input information for the search through the portal service.

\* \* \* \* \*